United States Patent
Marin et al.

(10) Patent No.: US 8,832,252 B2
(45) Date of Patent: Sep. 9, 2014

(54) EXTENSIBLE INTEGRATION BETWEEN SERVICE PLATFORMS

(75) Inventors: Cristian-Mihai Marin, Bucharest (RO); Eduard-Ionel Orasanu, Bucharest (RO)

(73) Assignee: Adobe Systems Incorporated, San Jose, CA (US)

( * ) Notice: Subject to any disclaimer, the term of this patent is extended or adjusted under 35 U.S.C. 154(b) by 73 days.

(21) Appl. No.: 13/456,961

(22) Filed: Apr. 26, 2012

(65) Prior Publication Data
US 2013/0290501 A1    Oct. 31, 2013

(51) Int. Cl.
*G06F 15/16*    (2006.01)
(52) U.S. Cl.
USPC .................. 709/223; 379/207.02; 705/39
(58) Field of Classification Search
USPC ......................................................... 709/223
See application file for complete search history.

(56) References Cited

U.S. PATENT DOCUMENTS

| | | | |
|---|---|---|---|
| 2004/0066925 A1* | 4/2004 | Rosera et al. ............ | 379/207.02 |
| 2008/0010190 A1* | 1/2008 | Rackley, III et al. .......... | 705/39 |
| 2008/0010193 A1* | 1/2008 | Rackley, III et al. .......... | 705/39 |
| 2010/0042475 A1* | 2/2010 | Salzinger et al. ............... | 705/10 |
| 2012/0011170 A1* | 1/2012 | Elad et al. .................... | 707/804 |

* cited by examiner

*Primary Examiner* — Hamza Algibhah
(74) *Attorney, Agent, or Firm* — Wolfe-SBMC

(57) ABSTRACT

A generic integration engine receives a markup service indicator that indicates a data flow protocol between a client and a service provider. In addition, the generic integration engine performs a data exchange with the service provider based on an outgoing data model indicated by the markup service indicator. The outgoing data model indicates a platform independent interface that is utilized to communicate with the service provider. The generic integration engine also performs a data exchange with the service provider based on an incoming data model indicated by the markup service indicator. The incoming data model indicates the platform independent interface that is utilized to communicate with the service provider.

20 Claims, 5 Drawing Sheets

EXTENSIBLE INTEGRATION BETWEEN SERVICE PLATFORMS

BACKGROUND

1. Field

This disclosure generally relates to computing devices. More particularly, the disclosure relates to service platforms.

2. General Background

A payment gateway is an online authorization system that authorizes payment from a customer to a merchant through a payment processor. As an example, a payment gateway encrypts data being exchanged. Currently, the vast majority of the payment gateways on the Internet utilize their own Application Programming Interface ("API") model and implementations to expose access for websites to their payment functionality. The websites that have to integrate multiple payment gateways typically have a separate implementation for each integration to cover the differences between data models, API flows, and communication protocols such as SOAP, XML, HTTP Post, Proprietary, or the like. To ensure full functionality, each integration has to be tested. Further, current approaches involve modifications to the code base of a website. As a result, a large degree of complexity is involved with creating new integration with third party service providers.

Further, the payment gateways distribute integration implementation, which is performed by platform owners. Payment gateways cannot practically change their APIs because all platform owners would then have to change their respective implementations, which would is currently difficult. Further, current approaches do not allow new implementations to be easily added when new platforms become more popular.

SUMMARY

In one aspect of the disclosure, a computer program product is provided. The computer program product includes a computer useable medium having a computer readable program. The computer readable program when executed on a computer causes the computer to receive, at a generic integration engine, a markup service indicator that indicates a data flow protocol between a client and a service provider. In addition, the computer readable program when executed on the computer causes the computer to perform, at the generic integration engine, a data exchange with the service provider based on an outgoing data model indicated by the markup service indicator. The outgoing data model indicates a platform independent interface that is utilized to communicate with the service provider. The computer readable program when executed on the computer causes the computer to perform, at the generic integration engine, a data exchange with the service provider based on an incoming data model indicated by the markup service indicator. The incoming data model indicates the platform independent interface that is utilized to communicate with the service provider.

In another aspect of the disclosure, a process is provided. The process receives, at a generic integration engine, a markup service indicator that indicates a data flow protocol between a client and a service provider. In addition, the process performs, at the generic integration engine, a data exchange with the service provider based on an outgoing data model indicated by the markup service indicator. The outgoing data model indicates a platform independent interface that is utilized to communicate with the service provider. The process also performs, at the generic integration engine, a data exchange with the service provider based on an incoming data model indicated by the markup service indicator. The incoming data model indicates the platform independent interface that is utilized to communicate with the service provider.

In yet another aspect of the disclosure, a system is provided. The system includes a generic integration engine that receives a markup service indicator that indicates a data flow protocol between a client and a service provider performs a data exchange with the service provider based on an outgoing data model indicated by the markup service indicator, and performs a data exchange with the service provider based on an incoming data model indicated by the markup service indicator. The outgoing data model indicates a platform independent interface that is utilized to communicate with the service provider. The incoming data model indicates the platform independent interface that is utilized to communicate with the service provider.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

A computer program product, method, apparatus, and system utilize a framework that has at least one service indicator, which is independent of website/web platform technology. This framework enables websites and web platforms to integrate with new third party services without requiring source code recompilation or deployments to production environments. Further, the framework may reduce the time involved in implementing new integrations.

The framework allows for a unified approach so that a website/web platform and any third party service with similar functionality that exposes public APIs, e.g., payment providers, shipping providers, or the like may have a platform independent integration. Accordingly, the API owner that provides the third party service outside the website/platform may rely on the framework existence in the website/platform to efficiently develop and distribute a service indicator independent of website/web platform technology.

Figure 1:
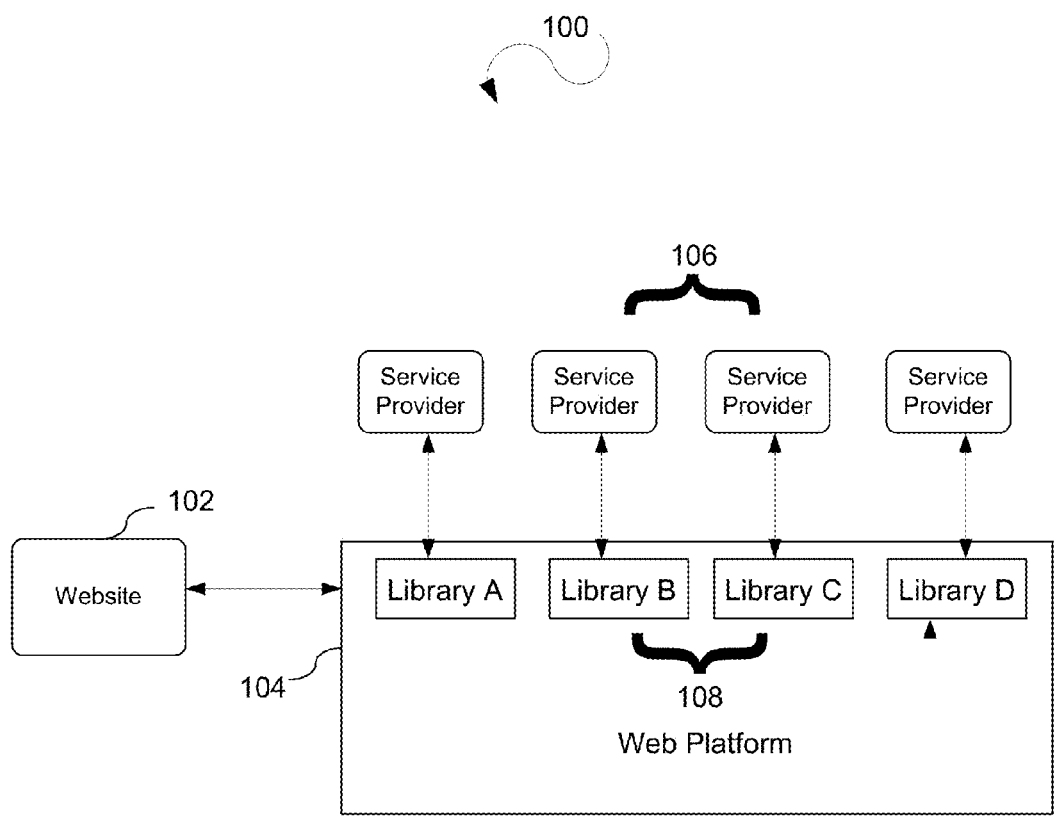
FIG. 1 illustrates a configuration that is platform dependent.
Figure 1:
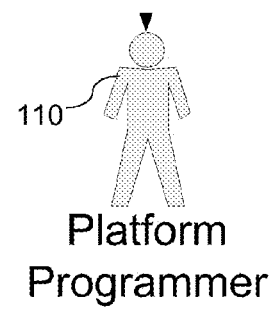

FIG. 1 illustrates a configuration 100 that is platform dependent. A website 102 may be hosted on a web platform 104. Further, the website 102 may want to allow items to be purchased, shipped, or the like. Accordingly, the web platform 104 may have internal code for each of a plurality of service providers 106. The web platform 104 determines which service provider to utilize and recompiles the code to generate a plurality of libraries 108, e.g., a library A, a library B, a library C, and a library D. The web platform 104 decides which of the available libraries is utilized for that service provider to allow for payment, shipping, or the like of an item or service that is purchased from the website 102. A platform programmer 110 may be utilized to generate the code of each library. As an example, the platform programmer 110 may have generated the code for the library D.

The integration with servers for the plurality of service providers 106 is implemented at the code level by composing the request messages and parsing the received response from the system of a particular service provider from the plurality of service providers 106. New code is likely compiled into libraries and pushed to production environments in order to implement new integrations with the plurality of service providers 106, e.g., payment gateways, shipping providers, or the like.

Figure 2:
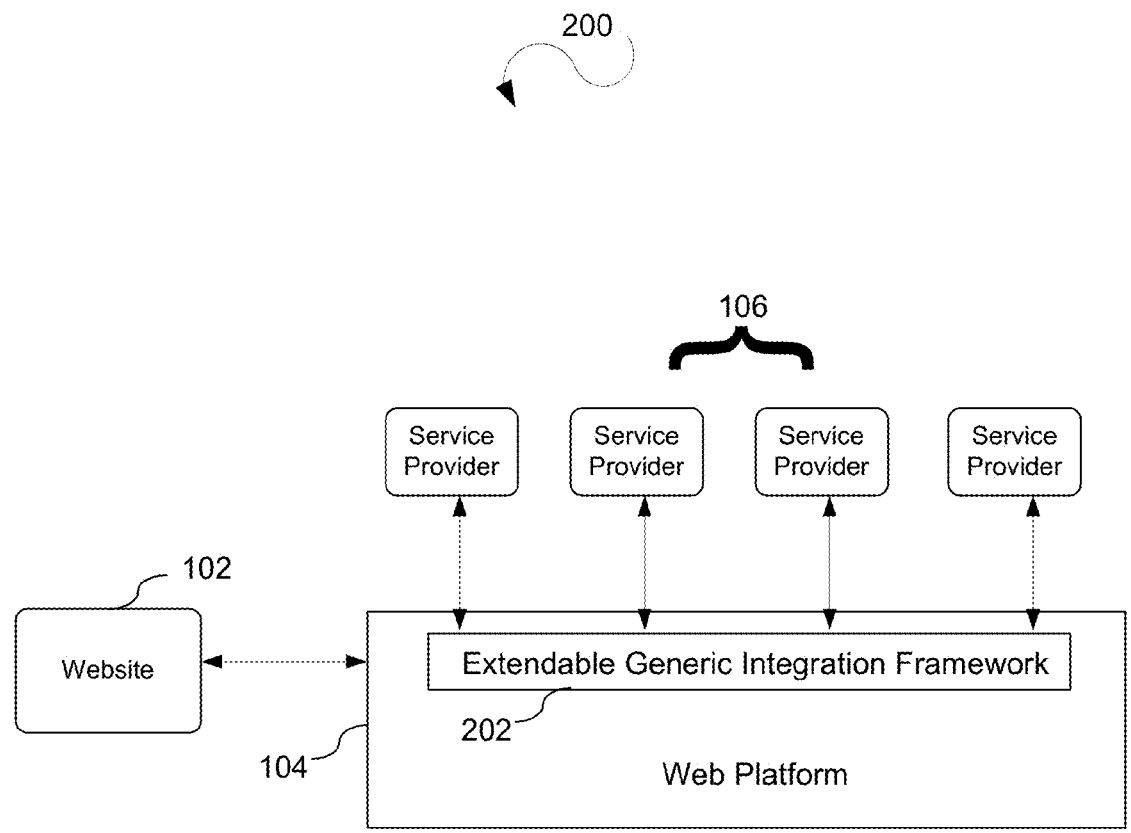
FIG. 2 illustrates an extensible generic integration configuration that is platform independent.

FIG. 2 illustrates an extensible generic integration configuration 200 that is platform independent. At least one markup service indicator may be sent from the website 102 to the web platform 104. For example, the service indicator may be an XML file. The markup service indicator may indicate how integration should be performed between the web platform 104 and a particular service provider from the plurality of service providers 106. The new service provider integration may be performed by plugging the markup service indicator into the web platform 104. As a result, new code does not have to be written for the web platform 104 each time a new service provider is added. The web platform 104 may perform the integration with an extendable generic integration framework 202. Further, a new integration with a service provider may be pushed to production without requesting a full deployment. In other words, a new service provider may be added without a library having to be modified, which may include service providers that are not involved at all with the service provider that is being added. In addition, integrations may be performed by developers that do not have access to the platform source code of the web platform 104. Accordingly, integrations may be performed in a platform independent manner that does not rely on knowledge of any particular platform. Therefore, programmers with less advanced programming skills may contribute new integrations. The configuration 200 is a framework that allows communication between a variety of different web platforms and service providers without restrictions on conversions between data model and object orient programming languages.

Figure 3:
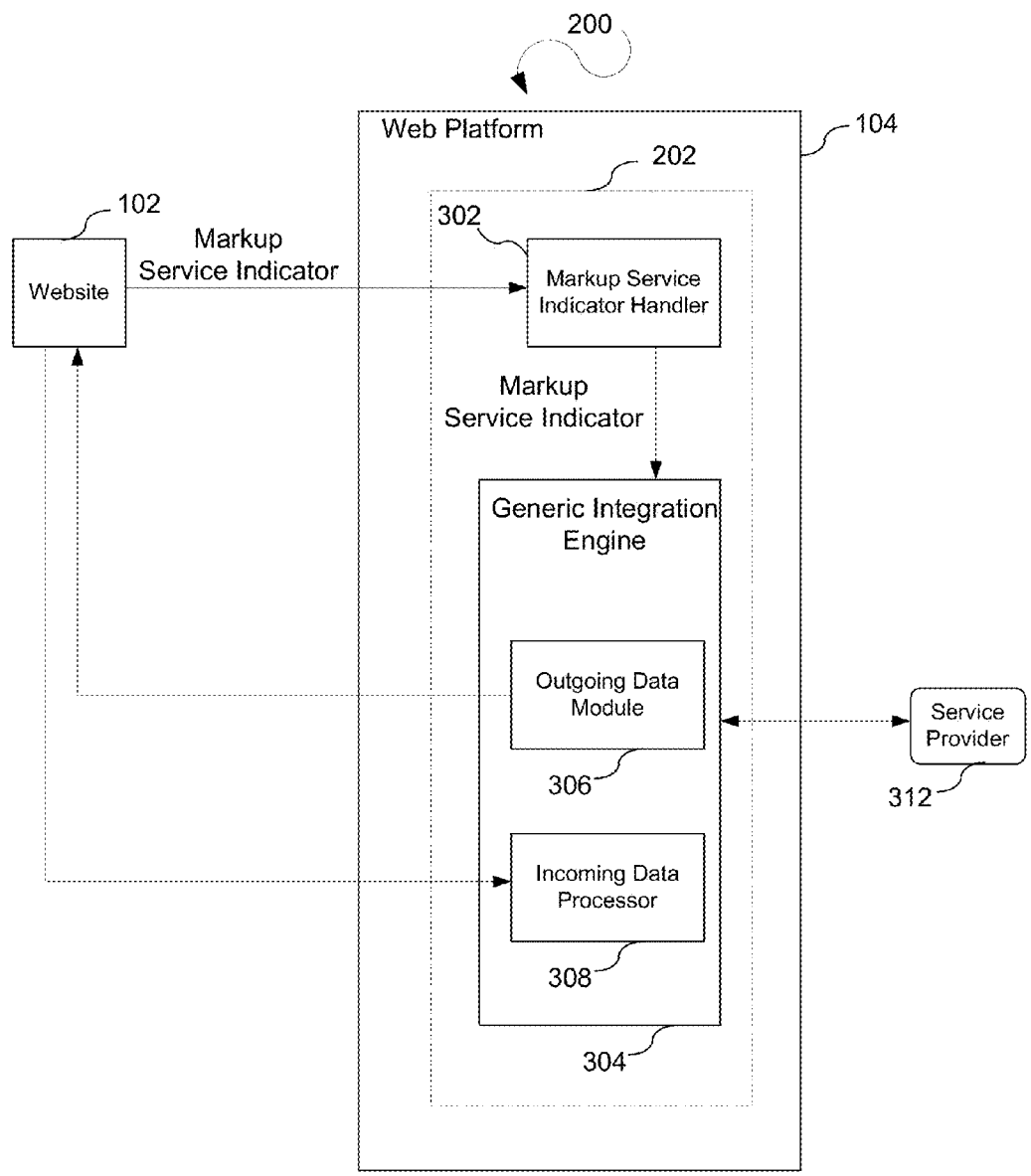
FIG. 3 illustrates an expanded view of the extensible generic integration configuration illustrated in FIG. 2.

FIG. 3 illustrates an expanded view of the extensible generic integration configuration 200 illustrated in FIG. 2. The extendable generic integration framework 202 receives a markup service indicator from the website 102. In one embodiment, the extendable generic integration framework 202 includes a markup service indicator handler 302 that sends the markup service indicator to a generic integration engine 304.

The markup service indicator describes the data flow between a web platform and a service provider. In one embodiment, outgoing and incoming data flows may be described utilizing a template language, a template markup language, or the like. Accordingly, the markup service indicator is powerful enough to describe complex messages between the client application and the service provider. The outgoing message template describes data that is utilized by the service provider and the format of the message being sent by the web platform 104. The data that is utilized is exposed and modeled by the web platform 104 utilized a standardized format provided by the generic integration engine 304 irrespective of the particular service provider data and communication protocol of the service provider. An outgoing data module 206 is utilized by the generic integration engine 304 to perform the data exchange with the service provider. In one embodiment, a template language, a template markup language, or the like may be utilized by the generic integration engine 304 to utilize the outgoing data module 306. In another embodiment, a set of validation rules imposed by the service provider may be described for the outgoing message and enforced by the generic integration engine 304. For example, a template markup language may be utilized to generate custom filters and blocks for data processing and transformation.

An example of an outgoing message is as follows:

```
<OutgoingMessageTemplate>
    <RawOutgoingMessageTemplate>
        <![CDATA[OPERATION=SAL& ECI=7&
            PSPID={{configuration.3rdParty}}&
            USERID={{configuration.CustomerID}
            }&
            PSWD={{configuration.Signature | urlEncode}}&
            EMAIL={{customerInfo.email}}&
            CARDNO={{creditCard.number}}&
            ED={{creditCard.expiryMonth}}{{creditCard.expiryYear}
            }& CVC={{creditCard.ccv}}&
            CN={{creditCard.holder | urlEncode}}&
            ORDERID={{transactionInfo.orderId}}&
            AMOUNT={{transactionInfo.amount | times:100}}&
            CURRENCY={{transactionInfo.currencyCode}}&
            COM={{transactionInfo.description |
            urlEncode}}&
            GLOBORDERID={{transactionInfo.orderId}}]]>
    </RawOutgoingMessageTemplate>
</OutgoingMessageTemplate>
```

Further, the incoming part of the markup service indicator maps the information from the incoming data to a data model exposed by the generic integration engine 304 with an incoming data processor 308 to the web platform 104. This mapping may be described utilizing a template language, a template markup language, or the like. In one embodiment, regular expression may be utilized to map the information from the incoming data to fields to be exposed by the data model that is exposed by the generic integration engine 304. In one embodiment, a set of validation rules may be added to assert some conditions on the incoming data and/or data transformation.

An example of an incoming processor description is as follows:

```
<IncomingMessageProcessor>
    <ValidationRules>
        <ExpectedValue field="{{response.statusCode}}"
        value="9"/>
    </ValidationRules>
    <Mapping>
        <RawIncomingMessageMapping>
            <![CDATA[<?xml version="1.0"?><ncresponse
            orderID="{{response.any}}"
            PAYID="{{response.transactionRef}}"
            NCSTATUS="{{response.any}}"
            NCERROR="{{response.errorCode}}"
            ACCEPTANCE="{{response.authorizationCode}
            }" STATUS="{{response.statusCode}}"
            amount="{{response.amount}}"
            currency="{{response.currencyCode}}"
            PM="{{response.any}}"
            BRAND="{{response.any}}"
            NCERRORPLUS="{{response.errorMessage}}">
            </ncresponse>
            ]]>
        </RawIncomingMessageMapping>
    </Mapping>
</IncomingMessageProcessor>
```

The generic integration engine 306 implements the data exchange and translation between a client application and a particular service provider 312. The data exchange and translation that is implemented is driven by the markup service indicator that is received by the web platform 104. Further, the generic integration engine 304 exposes a standardized interface at the end of the processing chain with any service provider. The web platform 104 may utilize the standardized interface to perform particular logic such as order generation, shipping confirmation, or the like.

The outgoing messages sent by the generic integration engine 304 may be described by the markup indicator. Various template languages, markup templates languages, or the like may be utilized for message description. The generic integration engine 306 may utilize a data model provided by the client application to compose outgoing messages to be sent to the service provider.

The incoming information may be extracted from messages received from a service provider by utilizing regular expressions or a particular query language. The markup indicator may describe the communication protocol that allows integration with a multitude of service providers.

Figure 4:
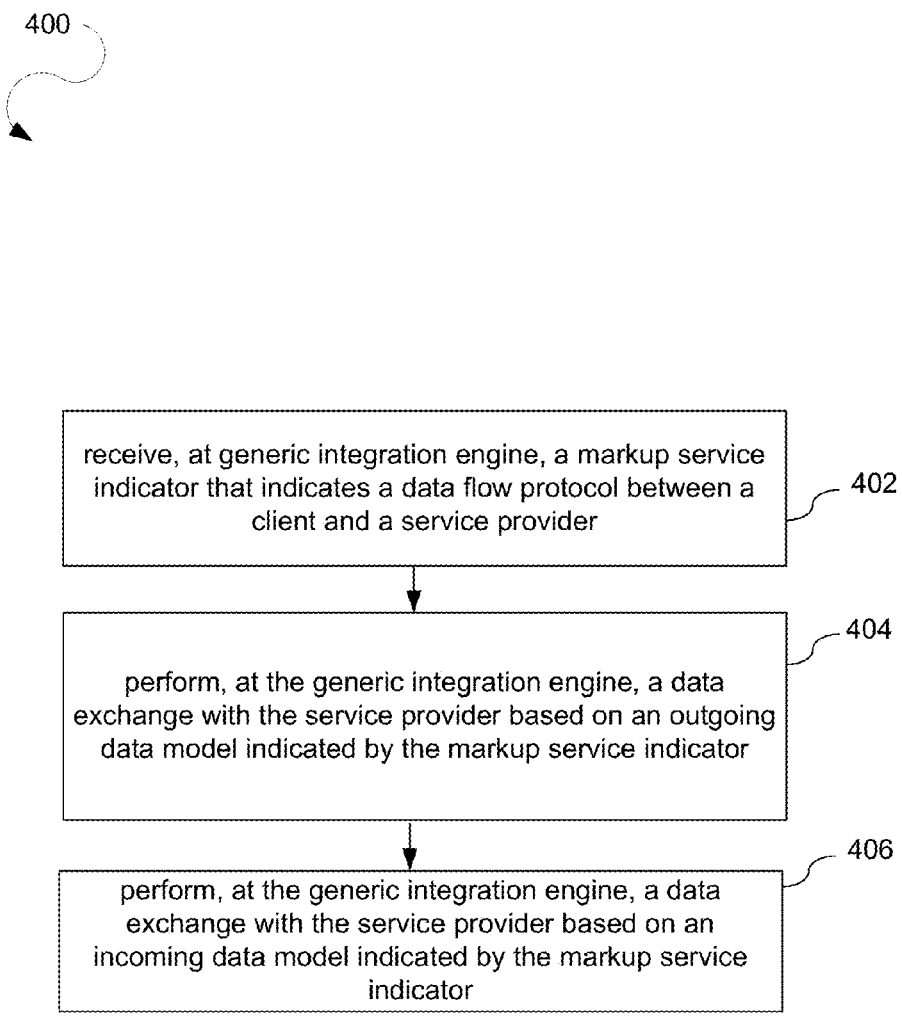
FIG. 4 illustrates a process that may be utilized to provide extensible integration.

FIG. 4 illustrates a process 400 that may be utilized to provide extensible integration. At a process block 402, the process 400 receives, at a generic integration engine. a markup service indicator that indicates a data flow protocol between a client and a service provider. In addition, at a process block 404, the process 400 performs, at the generic integration engine, a data exchange with the service provider based on an outgoing data model indicated by the markup service indicator. The outgoing data model indicates a platform independent interface that is utilized to communicate with the service provider. At a process block 406, the process 400 also performs, at the generic integration engine, a data exchange with the service provider based on an incoming data model indicated by the markup service indicator. The incoming data model indicates the platform independent interface that is utilized to communicate with the service provider.

Any of the configurations described herein may be utilized with a variety of computing devices. A computing device may be a PC, laptop, notebook, smartphone, cell phone, tablet device, personal digital assistant ("PDA"), kiosk, or the like. Further, any of the configurations described herein may be utilized with a variety of different user interfaces.

Figure 5:
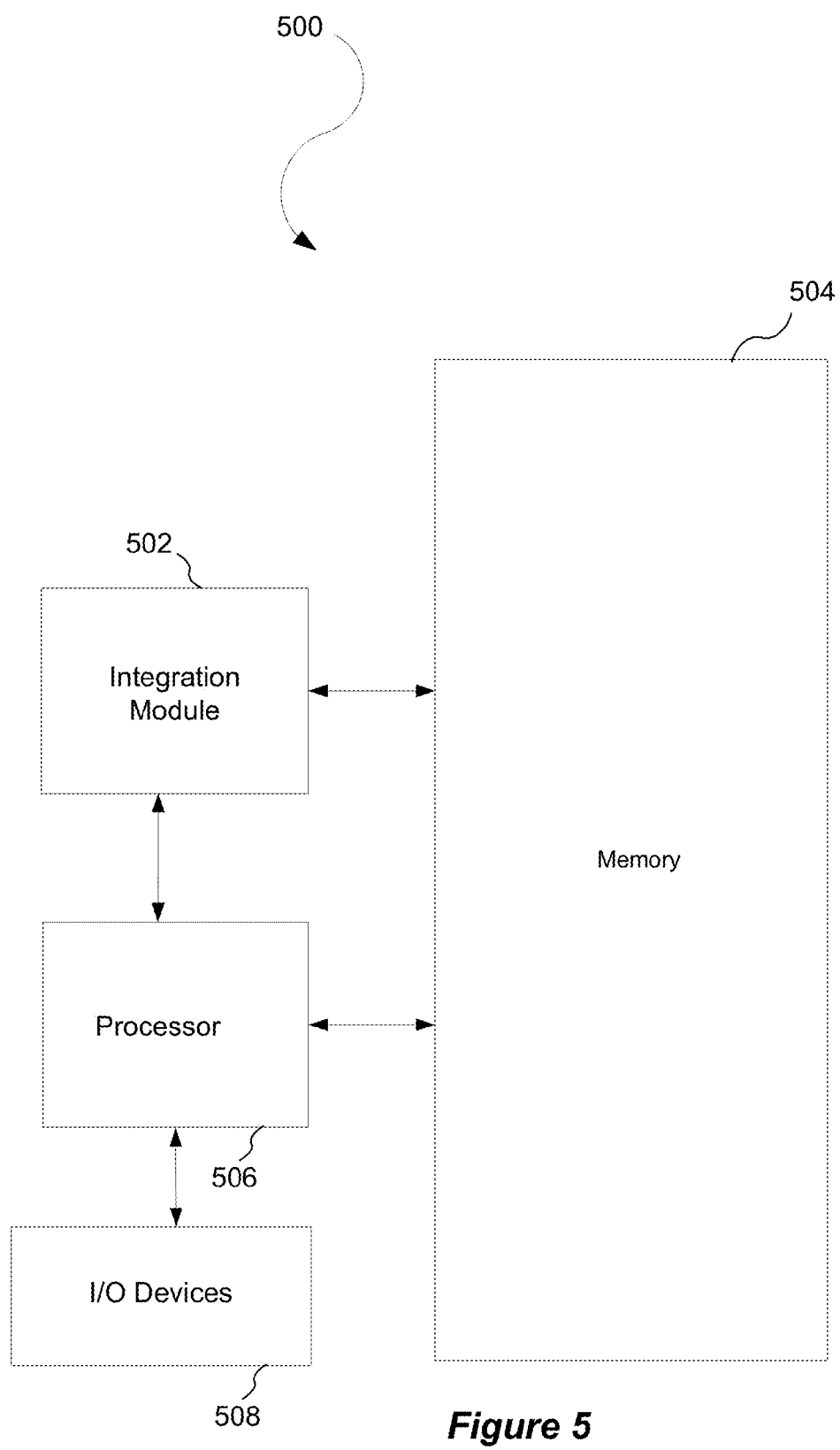
FIG. 5 illustrates a system configuration that may be utilized to provide extensible generic integration.

FIG. 5 illustrates a system configuration 500 that may be utilized to provide extensible generic integration. In one embodiment, an integration module 502 interacts with a memory 504 and a processor 506. In one embodiment, the system configuration 500 is suitable for storing and/or executing program code and is implemented using a general purpose computer or any other hardware equivalents. The processor 506 is coupled, either directly or indirectly, to the memory 504 through a system bus. The memory 504 may include local memory employed during actual execution of the program code, bulk storage, and/or cache memories which provide temporary storage of at least some program code in order to reduce the number of times code must be retrieved from bulk storage during execution.

The Input/Output ("I/O") devices 508 may be coupled directly to the system configuration 500 or through intervening input/output controllers. Further, the I/O devices 508 may include a keyboard, a keypad, a mouse, a microphone for capturing speech commands, a pointing device, and other user input devices that will be recognized by one of ordinary skill in the art. Further, the I/O devices 508 may include output devices such as a printer, display screen, or the like. Further, the I/O devices 508 may include a receiver, transmitter, speaker, display, image capture sensor, biometric sensor, etc. In addition, the I/O devices 508 may include storage devices such as a tape drive, floppy drive, hard disk drive, compact disk ("CD") drive, etc. Any of the modules described herein may be monolithic modules or modules with functionality distributed in a cloud computing infrastructure utilizing parallel and/or pipeline processing.

Network adapters may also be coupled to the system configuration 500 to enable the system configuration 500 to become coupled to other systems, remote printers, or storage devices through intervening private or public networks. Modems, cable modems, and Ethernet cards are just a few of the currently available types of network adapters.

The processes described herein may be implemented in a general, multi-purpose or single purpose processor. Such a processor will execute instructions, either at the assembly, compiled or machine-level, to perform the processes. Those instructions may be written by one of ordinary skill in the art following the description of the figures corresponding to the processes and stored or transmitted on a computer readable medium. The instructions may also be created utilizing source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above.

It should be understood that the computer program products, processes, apparatuses, and systems described herein can take the form of entirely hardware embodiments, entirely software embodiments, or embodiments containing both hardware and software elements. If software is utilized to implement the method or system, the software may include but is not limited to firmware, resident software, microcode, etc.

It is understood that the computer program products, processes, apparatuses, and systems described herein may also be applied in other types of computer program products, processes, apparatuses, and systems. Those skilled in the art will appreciate that the various adaptations and modifications of the embodiments of the computer program products, processes, apparatuses, and systems described herein may be configured without departing from the scope and spirit of the present computer program products, processes, apparatuses, and systems. Therefore, it is to be understood that, within the scope of the appended claims, the present computer program products, processes, apparatuses, and systems may be practiced other than as specifically described herein.

We claim:

1. A computer program product comprising a computer useable memory having a computer readable program, wherein the computer readable program when executed on a computer causes the computer to:

receive, at a web platform technology independent extensible generic integration engine and from a website, a markup service indicator that indicates a data flow protocol between a client web platform and a particular service provider of a plurality of service providers;

determine, by the extensible generic integration engine, which service provider of the plurality of service providers to utilize;

perform, at the extensible generic integration engine, a data exchange with the determined service provider based on an outgoing data model indicated by the markup service indicator, the outgoing data model indicating a platform independent interface that is utilized to communicate with the service provider; and perform, at the extensible generic integration engine, a data exchange with the service provider based on an incoming data model indicated by the markup service indicator, the incoming data model indicating the platform independent interface that is utilized to communicate with the service provider.

2. The computer program product of claim 1, wherein the markup service indicator is generated in an XML file.

3. The computer program product of claim 1, wherein the particular service provider of the plurality of service providers is a payment gateway.

4. The computer program product of claim 1, wherein the particular service provider of the plurality of service providers is a shipping provider.

5. The computer program product of claim 1, wherein the particular service provider of the plurality of service providers is a mail provider.

6. The computer program product of claim 1, wherein the particular service provider of the plurality of service providers is a web server.

7. The computer program product of claim 1, wherein the client web platform is executed on a computing device.

8. The computer program product of claim 1, wherein the computer is further caused to enforce, at the extensible generic integration engine, a set of validation rules for the outgoing data model.

9. The computer program product of claim 1, wherein the computer is further caused to enforce, at the extensible generic integration engine, a set of validation rules for the incoming data model.

10. A method comprising:

receiving, at a web platform technology independent extensible generic integration engine and from a website, a markup service indicator that indicates a data flow protocol between a client web platform and a particular service provider of a plurality of service providers;

determining, by the extensible generic integration engine, which service provider of the plurality of service providers to utilize;

performing, at the extensible generic integration engine, a data exchange with the determined service provider based on an outgoing data model indicated by the markup service indicator, the outgoing data model indicating a platform independent interface that is utilized to communicate with the service provider; and performing, at the extensible generic integration engine, a data exchange with the service provider based on an incoming data model indicated by the markup service indicator, the incoming data model indicating the platform independent interface that is utilized to communicate with the service provider.

11. The method of claim 10, wherein the markup service indicator is generated in an XML file.

12. The method of claim 10, wherein the particular service provider of the plurality of service providers is a payment gateway.

13. The method of claim 10, wherein the particular service provider of the plurality of service providers is a shipping provider.

14. The method of claim 10, wherein the particular service provider of the plurality of service providers is a mail provider.

15. The method of claim 10, wherein the particular service provider of the plurality of service providers is a web server.

16. The method of claim 10, wherein the client web platform is executed on a computing device.

17. The method of claim 10, further comprising enforcing, at the extensible generic integration engine, a set of validation rules for the outgoing data model.

18. The method of claim 10, further comprising enforcing, at the extensible generic integration engine, a set of validation rules for the incoming data model.

19. A system comprising:

a web platform technology independent extensible generic integration engine that receives from a website a markup service indicator that indicates a data flow protocol between a client web platform and a particular service provider of a plurality of service providers, determines which service provider of the plurality of service providers to utilize, performs a data exchange with the determined service provider based on an outgoing data model indicated by the markup service indicator, and performs a data exchange with the service provider based on an incoming data model indicated by the markup service indicator, the outgoing data model indicating a platform independent interface that is utilized to communicate with the service provider, the incoming data model indicating the platform independent interface that is utilized to communicate with the service provider.

20. The system of claim 19, wherein the markup service indicator is generated in an XML file.

\* \* \* \* \*